3,410,917
PREPARATION OF PRIMARY CHLORIDES
Robert Louw, Oegstgeest, Netherlands, assignor to Shell Oil Company, New York, N.Y., a corporation of Delaware
No Drawing. Filed July 19, 1965, Ser. No. 473,209
Claims priority, application Netherlands, Jan. 29, 1965, 6501239
7 Claims. (Cl. 260—658)

ABSTRACT OF THE DISCLOSURE

Primary alkyl chlorides are produced by contacting primary alkyl bromides with hydrogen chloride, at 0 to 100° C., in an alkaline, diploar, aprotic solvent.

---

This invention relates to an improved process for the preparation of saturated primary aliphatic chlorides. It relates more particularly to an improved process for the preparation of primary aliphatic chlorides containing 6 to 20 carbon atoms from the corresponding alpha olefins and/or aliphatic bromides.

Alkyl chlorides have become increasingly important as intermediates in the preparation of primary alcohols useful in the preparation of bio-degradable detergents. For example, alkyl chlorides may be converted into primary alcohols by alkaline hydrolysis. The alcohols thus obtained may be converted into surface-active agents by sulfation or sulfonation and incorporated into detergent compositions.

Up to the present, the preparation of normal primary alcohols having at least six carbon atoms in the molecule from the corresponding olefins has presented difficulties. For example, reaction of olefins having terminal double bonds and at least three carbon atoms with hydrogen chloride had yielded a product containing very little, if any, primary chlorides which might be readily converted into primary alcohols. The reaction follows the well known Markownikoff addition rule and yields secondary or tertiary alkyl chlorides.

On the other hand, primary alkyl bromides may be prepared by an anti-Markownikoff addition, i.e., the bromine atom of a hydrogen bromide molecule combines with the terminal carbon atom of an alpha olefin, while the hydrogen atom is attached to the non-terminal carbon atom of this molecule. This reaction takes place by adding HBr to an alpha olefin in the presence of a free radical initiator such as ultraviolet light. The addition of hydrogen chloride to an alpha olefin under the same conditions does not produce a primary alkyl chloride. (See Royals, Advanced Organic Chemistry, 1954, Prentice-Hall, Inc., pp. 367–368.)

Although the reaction of olefins with hydrogen bromide according to the above reaction gives high yields of primary alkyl bromides, they are not suitable for the preparation of primary alcohols. For example, a drawback of the direct saponification of the alkyl bromides to primary alcohols is that the recovery of hydrogen bromide from the reaction mixture obtained is economically impractical.

Various methods have been proposed for the halogen interchange of organic bromides to chlorides; however, none have proven to be successful for the preparation of detergent range alkyl chlorides. For example, Hughes et al., J. Chem. Soc., 1955, p. 3173 teaches that lower alkyl chlorides may be prepared by reacting lithium chlorides with an alkyl bromide in acetone. McKenna et al., U.S. Patent 2,661,378 teaches that specialized unsaturated cycloaliphatic bromides can be reacted with a chloride in the presence of a Friedel-Crafts type compound. These methods involved the addition of a metal salt as the reactant or a catalyst.

It is an object of this invention to provide an improved process for the preparation of primary alkyl chlorides from olefins and alkyl bromides that does not require the presence of metal salts as catalysts or reactants.

It is also an object of this invention to provide a process for the preparation of primary alkyl chlorides that is relatively simple and wherein the hydrogen bromide produced may be readily removed and recovered. Other objects and advantages of the invention will become apparent from the detailed descriptions as follows.

It has now been found that alkyl chlorides having from 6 to 20 carbon atoms can be prepared from alkyl bromides and hydrogen chloride if the reaction is carried out in an alkaline, dipolar, aprotic reaction medium or solvent. There is no appreciable loss of hydrogen bromide under these conditions and the chlorides thus obtained are suitable for the preparation of primary alcohols.

In its broad aspect this invention relates to a process for the preparation of primary alkyl chlorides having from 6 to 20 carbon atoms from the corresponding alpha olefins. The alpha olefin is reacted with hydrogen bromide in an inert apolar solvent and in the presence of a free radical initiator to form a primary alkyl bromide. The alkyl bromide is then contacted with hydrogen chloride in an alkaline, dipolar, aprotic solvent to form the corresponding alkyl chloride and hydrogen bromide which are then separated.

In the present process, unbranced olefins are preferred starting materials. Monoolefins as well as diolefins with terminal double bonds are suitable. The latter compounds may yield large quantities of primary dichlorides. If desired, one may also start from branched olefins. Olefins which are substituted, i.e., in which one or more hydrogen atoms have been replaced by substituents such as chlorine and bromine atoms, may also be used as starting materials.

The olefins used as starting materials in the present process contain at least 6 and usually not more than 20 carbon atoms per molecule. However, it is preferable to start with olefins containing from 8 to 15 carbon atoms. Examples of suitable starting materials are n-hexene-1,6-chlorohexene-1, hexadiene-1,5, n-octene-1, n-decene-1, n-undecene-1, n-dodecene-1, dodecadiene-1,11 and n-tetradecene-1.

Mixtures of two or more olefins are also suitable for application as starting materials in the present process. For example, mixtures obtained by cracking of paraffinic hydrocarbons, such as paraffins and high-boiling paraffinic fractions and residues obtained by distillation of mineral oils may be used.

The addition of hydrogen bromide to olefins with terminal bonds and having at least three carbon atoms per molecule as such is known. This addition is assumed to involve a free radical chain reaction, which can be schematically represented as follows:

The formation of Br· radicals can be initiated by causing the reaction to proceed in the presence of one or more peroxides or other free radical forming initiators and/or under the influence of ultraviolet light, preferably with wavelengths below 2900 A.

The addition is preferably performed in the liquid phase at a temperature ranging from about −80 to 200° C.; however, when using some initiators the addition can also be performed at temperatures outside this range.

While the addition may be carried out in the presence of hydrogen bromide alone it is preferable to contact the olefins with hydrogen bromide-containing mixtures. Mixtures of hydrogen bromide and hydrogen chloride, in which the molar ratio of hydrogen bromide to hydrogen chloride is between 1:100 and 40:1 and preferably between 1:15 and 20:1 are especially useful.

The addition may be carried out in the presence of diluents and/or solvent which are preferably apolar compounds such as benzene, pentane, heptane and carbon disulfide.

Atmospheric pressure is usually applied; however, if the reaction mixture contains one or more solvents, the concentration of the olefin in the reaction mixture may be increased by using superatmospheric pressures.

Hydrogen bromide is usually added to the olefin in equimolar ratios; however, other ratios may be used if desired without departing from the scope of this invention.

According to the invention, the primary alkyl bromides obtained from the above addition reactions are converted into primary alkyl chlorides by reaction with hydrogen chloride. In order to reach a high degree of conversion, it is advantageous to use as high a molar ratio of hydrogen chloride to alkyl bromide as is possible. For example, at least 1 and preferably at least 10 times as many moles of hydrogen chloride is desirable. It is therefore preferred to use a solvent in which hydrogen chloride has a relatively high solubility and it is preferable to use a reaction medium in which hydrogen chloride has a concentration, at the prevailing reaction conditions, of at least 10 molar percent.

The choice of solvent used is extremely critical to the attainment of this invention. In general, alkaline, aprotic, dipolar solvents are required and in particular those having dipole moments of at least 2.5D. These compounds include solvents having a $pK_a$ at least equal to $-1$. For a definition of $pK_a$ reference is made to Hammett, Physical Organic Chemistry, 1940, pp. 254–255. Very suitable solvents of this class are dimethyl formamide, diethyl formamide, dimethyl acetamide, methylethyl acetamide, diethyl acetamide, N-methyl pyrrolidone, sulfolane and acetonitrile. Dimethyl formamide is especially preferred and can, if desired, be used in combination with one or more other solvents.

The reaction is preferably carried out at temperatures ranging from 0 to 100° C. but, if desired, temperatures above or below this range may be used.

The primary alkyl chlorides are generally isolated from the reaction medium before the hydrogen bromide formed is recovered. Conventional methods such as distillation and extraction are suitable for isolation of the alkyl chlorides from the reaction medium. Distillation is usually preferred when isolating relatively low-boiling chlorides such as hexyl chloride. The higher boiling chlorides are preferably isolated by extraction with liquid hydrocarbon extractants such as heptane or isooctane.

Hydrogen bromide may be recovered from the reaction medium by various methods. The suitability of a certain method is, to a major extent, determined by the degree of solvation of hydrogen bromide in the reaction medium chosen. At a low degree of hydrogen bromide solvation, hydrogen bromide may be recovered by passing hydrogen chloride or a hydrogen chloride-containing gas into the reaction mixture. If hydrogen chloride is used in excess with respect to hydrogen bromide, hydrogen bromide is gradually expelled from the reaction mixture. The mixture of hydrogen bromide and hydrogen chloride thus obtained is suitable for direct use in the addition of hydrogen bromide to olefins as stated above. The addition of hydrogen chloride from this mixture to olefin is negligible.

When the reaction medium used is one in which the hydrogen bromide is strongly solvated it is advantageous to convert hydrogen bromide in situ either wholly or partially into a metal bromide, e.g., into an alkali incorporating metal bromide such as lithium bromide. This may be accomplished by incorporating one or more metal chlorides into the reaction medium. Hydrogen chloride and one or more metal bromides are thus formed and are readily separated. If desired, the hydrogen bromide may be recovered by reaction with hydrogen chloride as in the preceding paragraph.

When using a preferred medium, such as dimethyl formamide, best results are obtained by a method in which one or more metal bromides, which are more strongly solvated in the reaction medium in question than hydrogen bromide, are incorporated into the reaction medium. Suitable bromides are those of the alkali metals such as sodium, potassium and lithium as well as bromides of magnesium, zinc and calcium. When these metal bromides are incorporated into the solvent a considerable part of the hydrogen bromide present can be liberated and the metal bromide can be recovered by heating, by displacing the alkaline medium by a neutral solvent, or by interaction with excess hydrogen chloride.

As stated above, the alkyl chlorides prepared according to the invention may be readily converted into primary alcohols by alkaline hydrolysis. The primary alcohols may then be converted by well known methods such as sulfonation or sulfation into surface active agents which are useful as active ingredients in detergent compositions.

PREPARATION OF ALKYL BROMIDES

Example I

A solution was prepared by dissolving 165 grams (1.9 moles) of 1-hexene in 620 grams (6.2 moles) of heptane in a reaction vessel provided with a stirrer and ultraviolet lamp. Gaseous hydrogen bromide was passed, with stirring, into this solution at a temperature of $-45°$ C. and at a pressure of one atmosphere for three hours at which time the theoretical quantity of hydrogen bromide had been taken up.

The yield of n-hexyl bromide was 97.6%. The product also showed a yield of 2-hexyl bromide of 2%.

Example II

A solution was prepared by dissolving 21.3 grams of 1-hexene in 60 grams of heptane in a reaction vessel provided with a stirrer and ultraviolet lamp. While stirring the solution, maintained at 10° C., a gaseous mixture of hydrogen chloride, hydrogen bromide and nitrogen was introduced at a rate of 500, 40 and 80 millimoles per hour, respectively. The contact time of the gaseous mixture was about 1 second. The reaction was allowed to proceed until a stoichiometric quantity of hydrogen bromide had been taken up whereupon the product was analyzed. The analysis showed that 60 molar percent of the hydrogen bromide fed in was converted into hexyl bromide. The selectivity with respect to n-hexyl bromide was 90.5% and with respect to 2-hexyl bromide 9.5% based on converted 1-hexene.

The molar quantity of hexyl chloride formed was less than 1% of the molar quantity of hexyl bromide.

Example III

The procedure of Example I was followed using 2.7 parts by weight of 1,5-hexadiene and 88.6 parts by weight hydrogen bromide. The reaction proceeded at $-78°$ C. The product obtained showed a yield of 1,6-dibromohexane of 95%.

Example IV

The procedure of Example I was again followed using 1-dodecene in the place of 1-hexene. The yield of n-dodecyl bromide was comparable to that obtained in Example I for n-hexyl bromide.

PREPARATION OF ALKYL CHLORIDES

Example V

A 25.4 gram sample of n-hexyl bromide prepared according to Example I was added with stirring to a reaction vessel containing a mixture of 8.35 grams of hydrogen chloride, 0.347 gram of lithium chloride, 59.3 grams of dimethyl acetamide and 153.5 grams of sulfolane (tetramethylene sulfone) maintained at a temperature of 60° C. After one hour the reaction was terminated by cooling the mixture and the reaction product was obtained by extracting the reaction mixture three times with 100 ml. of pentane being used for each extraction.

The extract was distilled with the pentane being removed first. The remaining product weighed 12.5 grams and at 90 mm. pressure (Hg) had a boiling point of 67–69° C. By infra-red spectrography it was determined that the product obtained was n-hexyl chloride. The conversion was 67.5%.

Example VI

Into a reaction vessel containing 1000 grams of dimethyl formamide and 130 grams of hydrogen chloride was added, with constant stirring, 97.6 grams of 1,6-dibromohexane obtained according to the method described in Example III. The reaction was allowed to proceed at a temperature of 70–80° C. for 1½ hours after which it was terminated by cooling. The reaction mixture was extracted continuously for 10 hours with 500 ml. of pentane.

Upon settling the mixture separated into two layers. Distillation of the top layer yielded 50 grams of a product boiling at 95° C. (23 mm. Hg pressure).

Elementary analysis gave the following result:

|  | Product | Calculated for 1,6-dichlorohexane |
|---|---|---|
| Carbon content, percent wt | 46.5 | 46.4 |
| Hydrogen content, percent wt | 7.9 | 7.74 |
| Chlorine content, percent wt | 45.6 | 45.8 |

A spectrum recorded by means of nuclear spin resonance showed that more than 99% of the product consisted of 1,6-dichlorohexane.

The bottom layer of the extracted mixture was analyzed by gas-liquid chromatography. It consisted mainly of dimethyl formamide; however, 7.5 grams of 1,6-dichlorohexane was also present. The total yield of 1,6-dichlorohexane, calculated with bromohexane as a basis, was 92%.

Example VII

A 600 gram sample of dimethyl formamide was distilled and dried over molecular sieves (Linde 5A) and placed in a one liter flask provided with a stirrer, thermometer, dropping funnel and drying tube containing calcium sulfate. A mixture was formed by adding 71 grams (1.95 moles) of hydrogen chloride. Under constant stirring at a temperature of between 70 and 80° C., 75.5 grams (0.30 mole) of n-dodecyl bromide was added to the dimethyl formamide, hydrogen chloride mixture. By potentiometric titration for hydrogen chloride and hydrogen bromide it was determined that after 10 minutes 61% and after 50 minutes 97.6% of the bromine in the dodecyl bromide had been exchanged for chlorine. After 1½ hours the reaction mixture was cooled to room temperature and extracted with heptane. The extract was dried with calcium sulfate and distilled. The product obtained contained 57.6 grams of n-dodecyl chloride which represents a 93% yield. A spectrum recorded by means of nuclear spin resonance showed that more than 99% of the chloride obtained was n-dodecyl chloride.

Hydrogen bromide, formed in the preparation of alkyl chlorides, remains behind in the reaction mixture. The following examples describe methods suitable for the recovery of hydrogen bromide from dimethyl formamide containing mixtures in which hydrogen bromide is solvated either wholly or substantially.

Example VIII

A mixture consisting of 15% hydrogen bromide, 6.22% hydrogen chloride and 78.78% dimethyl formamide was distilled under reduced pressure. The first fraction, having a boiling point of 37° C. at a pressure of 6 mm mercury, consisted of 23.12 parts by weight dimethyl formamide. The second fraction obtained had a boiling point between 39 and 41° C. at a pressure of 5 mm. mercury and consisted of 27.93 parts by weight of a mixture of dimethyl formamide and hydrogen chloride solvated in dimethyl formamide. A third fraction was obtained containing 2.78 parts by weight of the original mixture. This fraction boiled at 52° C. at 0.7 mm. mercury and contained 29.71% hydrogen bromide and 8.62% hydrogen chloride. The residue still contained 1.05 moles of dimethyl formamide per mole of hydrogen bromide. All percentages given are percentages by weight.

Example IX

At atmospheric pressure and at a temperature of 60° C., a nitrogen stream was passed slowly into a mixture of 81.2 grams of dimethyl formamide, 88.9 grams of hydrogen bromide and 7.07 grams of hydrogen chloride. In the exit gas the initial ratio of the molar quantities of entrained hydrogen bromide and hydrogen chloride was 1:7. Subsequently a gaseous mixture of hydrogen chloride and nitrogen was passed through the mixture. The hydrogen chloride was added in this manner at the rate of 25 millimoles per hour. The initial molar ratio of hydrogen bromide and hydrogen chloride in the exit gas was 11.9:88.1. The total quantity of hydrogen bromide removed was 10% of the quantity originally present.

Example X

Into a distilling flask was placed a mixture consisting of 279 millimoles of lithium bromide, 59.4 millimoles of sulfolane, 197.4 millimoles of dimethyl formamide and 180.2 millimoles of hydrogen bromide. The flask was equipped with a dephlegmator, two cooling zones, one of which was cooled with a mixture of ice and acetone and the other with liquid nitrogen, and a sodium asbestos filter.

The flask was placed in an oil bath maintained at 80° C. and heated at a pressure of 1.5 mm. mercury for 4 hours. At the end of this period 70.3 millimoles (39 molar percent) of free hydrogen bromide had assembled in the nitrogen cooled zone and on the filter. The other cooling zone did not contain any hydrogen bromide.

Distillation was continued at a pressure of 0.1 mm. mercury at an oil bath temperature of 130° C. The distillate fractions obtained contained dimethyl formamide, sulfolane and hydrogen bromide solvated in dimethyl formamide. The quantity of hydrogen bromide in these fractions was 107.2 millimoles, so that a total quantity of 177.5 millimoles of hydrogen bromide was recovered. The quantity of dimethyl formamide, together with that of sulfolane, in the distillate was 37.6 grams. The residue (total quantity 61.1 grams) contained 26.1 grams of lithium bromide.

I claim as my invention:

1. A process for the preparation of alkyl chlorides having 6 to 20 carbon atoms which comprises contacting a primary alkyl bromide having 6 to 20 carbon atoms with at least an equimolar quantity of hydrogen chloride at a temperature of from about 0 to 100° C. in an alkaline, dipolar, aprotic solvent selected from the group consisting of dimethyl formamide, diethyl formamide, dimethyl acetamide, methylethyl acetamide, diethyl acetamide, N-methyl pyrrolidone, sulfolane and acetonitrille and separating the primary akyl chloride therefrom.

2. A process according to claim 1 wherein the molar ratio of hydrogen chloride to alkyl bromide is at least 10:1.

3. A process according to claim 1 wherein the alkyl chloride produced has from 8 to 15 carbon atoms.

4. A process according to claim 3 wherein the alkaline, dipolar, aprotic solvent is dimethyl formamide.

5. A process according to claim 3 wherein the alkaline, dipolar, aprotic solvent is a mixture of dimethyl acetamide and sulfolane.

6. A process according to claim 4 wherein the hydrogen bromide formed during the reaction of hydrogen chloride and alkyl bromide is recovered by adding to the dimethyl formamide an alkali metal bromide more strongly solvated in the dimethyl formamide than hydrogen bromide, distilling the mixture formed under reduced pressure and recovering hydrogen bromide therefrom.

7. A process according to claim 6 wherein the alkali metal bromide is lithium bromide.

References Cited

UNITED STATES PATENTS

| | | | |
|---|---|---|---|
| 2,553,518 | 5/1951 | Lake et al. | 260—658 X |
| 2,675,413 | 4/1954 | Ballard et al. | 260—658 X |
| 3,321,538 | 5/1967 | Thiele et al. | 260—663 |
| 3,287,411 | 11/1966 | Wakeman et al. | 260—663 |
| 3,329,704 | 7/1967 | Goebel et al. | 260—663 X |

OTHER REFERENCES

Hughes et al., "J. Chem. Soc.," 1955, pp. 3173–77, QD1.C6.

LEON ZITVER, *Primary Examiner.*

T. G. DILLAHUNTY, *Assistant Examiner.*